US009296939B2

(12) United States Patent
Iverson et al.

(10) Patent No.: US 9,296,939 B2
(45) Date of Patent: Mar. 29, 2016

(54) COMPOSITIONS FOR MODIFYING RHEOLOGICAL PROPERTIES OF CEMENT SYSTEMS

(75) Inventors: Benjamin John Iverson, Duncan, OK (US); Narongsak Tonmukayakul, Duncan, OK (US); Ian Robb, Lawton, OK (US); Keith Douglas Pewitt, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 899 days.

(21) Appl. No.: 12/774,116

(22) Filed: May 5, 2010

(65) Prior Publication Data

US 2011/0275736 A1 Nov. 10, 2011

(51) Int. Cl.

| C09K 8/68 | (2006.01) |
|---|---|
| E21B 33/00 | (2006.01) |
| C09K 8/60 | (2006.01) |
| C09K 8/487 | (2006.01) |
| C04B 24/38 | (2006.01) |
| C04B 28/02 | (2006.01) |
| C04B 28/06 | (2006.01) |
| C04B 28/14 | (2006.01) |
| C04B 28/34 | (2006.01) |
| C04B 40/00 | (2006.01) |
| C09K 8/035 | (2006.01) |
| C09K 8/40 | (2006.01) |

(Continued)

(52) U.S. Cl.
CPC ............... *C09K 8/487* (2013.01); *C04B 24/38* (2013.01); *C04B 28/02* (2013.01); *C04B 28/06* (2013.01); *C04B 28/14* (2013.01); *C04B 28/34* (2013.01); *C04B 40/0039* (2013.01); *C09K 8/035* (2013.01); *C09K 8/40* (2013.01); *C09K 8/426* (2013.01); *C09K 8/428* (2013.01); *C09K 8/68* (2013.01); *C09K 8/882* (2013.01); *C09K 8/90* (2013.01); *C04B 2103/46* (2013.01)

(58) Field of Classification Search
CPC ........................................................ C04B 24/38
USPC ........................................................ 523/130
See application file for complete search history.

(56) References Cited

U.S. PATENT DOCUMENTS

| 4,515,635 A | 5/1985 | Rao et al. |
|---|---|---|
| 4,555,269 A | 11/1985 | Rao et al. |

(Continued)

FOREIGN PATENT DOCUMENTS

WO 2007053612 A2 5/2007

OTHER PUBLICATIONS

Halliburton brochure entitled "GasStop™ gas migration control additive," Nov. 2006, 2 pages, Halliburton.

(Continued)

*Primary Examiner* — David Karst
(74) *Attorney, Agent, or Firm* — Craig W. Roddy; Baker Botts L.L.P.

(57) ABSTRACT

A method of servicing a wellbore comprising contacting a wellbore servicing composition with a rheology modifying additive wherein the rheology modifying additive comprises a gum and a polymeric material. A method of cementing in a subterranean formation comprising providing a sealant composition comprising cement, water, and a rheology modifying additive wherein the rheology modifying additive comprises a gum and an anionic polymer, placing the composition in the subterranean formation, and allowing the cement composition to set therein.

22 Claims, 7 Drawing Sheets

(51) Int. Cl.
*C09K 8/42* (2006.01)
*C09K 8/88* (2006.01)
*C09K 8/90* (2006.01)
*C04B 103/46* (2006.01)

(56) References Cited

U.S. PATENT DOCUMENTS

| | | | |
|---|---|---|---|
| 4,676,317 | A | 6/1987 | Fry et al. |
| 5,175,278 | A | 12/1992 | Peik et al. |
| 5,346,012 | A | 9/1994 | Heathman et al. |
| 5,588,488 | A | 12/1996 | Vijn et al. |
| 5,900,053 | A | 5/1999 | Brothers et al. |
| 5,913,364 | A | 6/1999 | Sweatman |
| 6,143,069 | A | 11/2000 | Brothers et al. |
| 6,167,967 | B1 | 1/2001 | Sweatman |
| 6,258,757 | B1 | 7/2001 | Sweatman et al. |
| 6,332,921 | B1 | 12/2001 | Brothers et al. |
| 6,457,524 | B1 | 10/2002 | Roddy |
| 6,620,775 | B2 | 9/2003 | Winston et al. |
| 7,077,203 | B1 | 7/2006 | Roddy et al. |
| 7,159,658 | B2 * | 1/2007 | Frost et al. ............ 166/300 |
| 7,174,962 | B1 | 2/2007 | Roddy et al. |
| 7,584,791 | B2 | 9/2009 | Robb et al. |
| 7,595,282 | B2 | 9/2009 | Pauls et al. |
| 7,678,745 | B2 | 3/2010 | Parris et al. |
| 2008/0220992 | A9 * | 9/2008 | Pauls et al. ............ 507/211 |
| 2008/0269080 | A1 * | 10/2008 | Hutchins et al. ........ 507/202 |
| 2008/0300150 | A1 * | 12/2008 | Reddy et al. ........... 507/111 |
| 2010/0036017 | A1 | 2/2010 | Eoff et al. |

OTHER PUBLICATIONS

Halliburton brochure entitled "Halad®-344," Aug. 2007, 2 pages, Halliburton.

Halliburton brochure entitled "Halad®-413," Aug. 2007, 2 pages, Halliburton.

Halliburton brochure entitled "Suspend HT additive," 1999, 2 pages, Halliburton Energy Services, Inc.

Halliburton brochure entitled WG-17 LXP™, May 2006, 1 page, Halliburton.

Navarrete, R. C., et al., "New biopolymer for coiled tubing applications," SPE 68487, 2001, pp. 1-10, Society of Petroleum Engineers Inc.

Navarrete, R. C., et al., "New biopolymers for drilling, drill-in, completions, spacer, and coil-tubing fluids, part II," SPE 64982, 2001, pp. 1-15, Society of Petroleum Engineers Inc.

Montgomery, Douglas C., "Design and analysis of experiments," 2009, 1 page, John Wiley & Sons Inc.

* cited by examiner

COMPOSITIONS FOR MODIFYING RHEOLOGICAL PROPERTIES OF CEMENT SYSTEMS

FIELD

This disclosure relates to servicing a wellbore. More specifically, it relates to servicing a wellbore with compositions comprising rheology modifying additives and methods of using same.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Primary cementing of an oil or gas-well requires a satisfactory displacement of drilling mud by spacer fluid and cement slurry. In order to achieve satisfactory displacement, the cement slurry should exhibit desirable rheological properties. Such cement slurries/systems are especially needed for cementing eccentric wells. Consequently, there is continuing need and interest to develop wellbore servicing compositions such as cement slurries having desirable rheological properties.

SUMMARY

Disclosed herein is a method of servicing a wellbore comprising contacting a wellbore servicing composition with a rheology modifying additive wherein the rheology modifying additive comprises a gum and a polymeric material.

Further disclosed herein is a method of cementing in a subterranean formation comprising providing a sealant composition comprising cement, water, and a rheology modifying additive wherein the rheology modifying additive comprises a gum and an anionic polymer, placing the composition in the subterranean formation, and allowing the cement composition to set therein.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the embodiments disclosed herein, reference will now be made to the accompanying drawings in which.

DETAILED DESCRIPTION

Disclosed herein are wellbore servicing compositions and methods of making and using same. In an embodiment, the wellbore servicing composition comprises a cementitious material and a rheology modifying additive (RMA), wherein the RMA comprises a gum and a polymeric material. The compositions disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art. It is to be understood that "subterranean formation" encompasses both areas below exposed earth and areas below earth covered by water such as ocean or fresh water.

Figure 1:
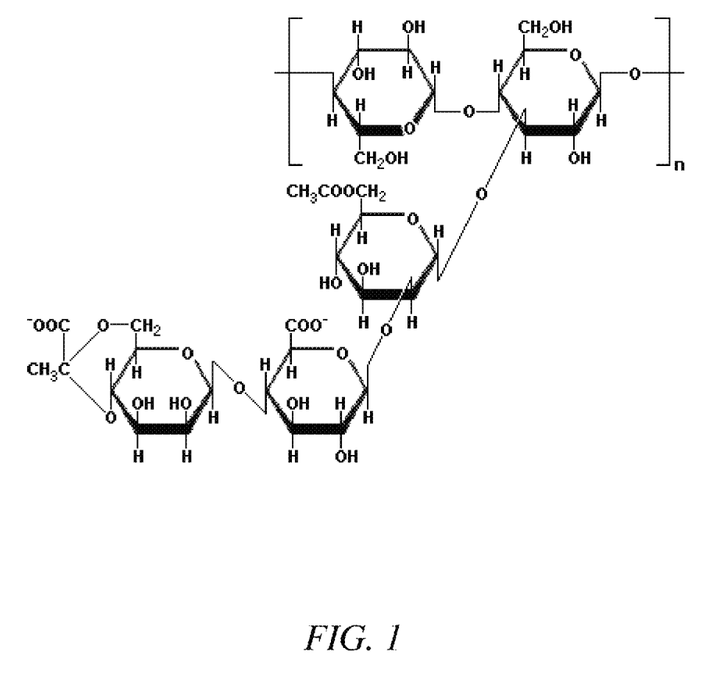
FIG. 1 illustrates the molecular structure of DIUTAN.

In an embodiment, the wellbore servicing compositions disclosed herein comprise a RMA which comprises a gum and a polymeric material. Herein a gum refers to polysaccharides capable of increasing the viscosity of a solution when used at small concentrations. Viscosity is a measure of the resistance of a fluid which is being deformed by shear stress. In other words, it is the resistance of a liquid to flow. Most often these gums are found in the woody elements of plants or in seed coatings. Examples of gums suitable for use in this disclosure include without limitation agar, alginic acid, beta-glucan, carrageenan, chicle gum, dammar gum, gellan gum, guar fum, gum arabic, gum ghatti, gum tragachanth, karava gum, locust bean gum, mastic gum, psyllium seed husks, sodium alginate, spruce gum, tara gum, xanthan gum, or combinations thereof. In an embodiment, the gum comprises xanthan gum whose structure is illustrated in FIG. 1. Referring to FIG. 1, n represents the number of monosaccharide units that provide a polysaccharide having a molecular weight within the disclosed ranges.

Figure 2:
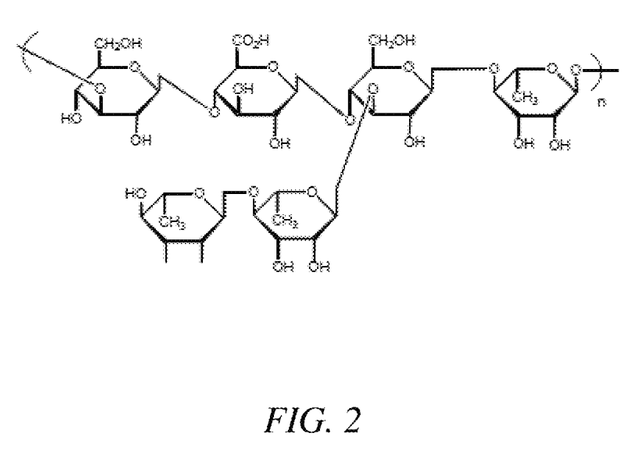
FIG. 2 illustrates the molecular structure of xanthan.

Gums having characteristics disclosed herein from man-made sources (e.g., synthetic) are also contemplated as being suitable for use in this disclosure. In some embodiments, the gum comprises a biopolymer characterized by a double helical structure and a degradation temperature in the range of less than about 310° F., alternatively from about −40° F. to about 300° F., alternatively from about 80° F. to about 250° F. Herein the degradation temperature refers to the temperature at which the polymer backbone disintegrates. In an embodiment, the gum displays viscoplastic behavior characterized by shear thinning behavior wherein the viscosity of a gum solution decreases with increasing shear rate. For example, the gum may comprise DIUTAN gum which is a biopolymer commercially available from CP KELCO. The structure of DIUTAN gum is illustrated in FIG. 2. Referring to FIG. 2, n represents the number of monosaccharide units that provide a polysaccharide having a molecular weight within the disclosed ranges.

In an embodiment, the RMA comprises a gum with an average molecular weight in the range of from about 20,000 Daltons to about 10,000,000 Daltons; alternatively from about 35,000 Daltons to about 5,000,000 Daltons; alternatively from about 50,000 Daltons to about 3,000,000 Daltons.

The gum may be present in the RMA in an amount of from about 0.01 wt. % to about 5 wt. % percent by weight of water, alternatively from about 0.05 wt. % to about 3 wt. %, alternatively from about 0.075 wt. % to about 1.0 wt. %.

Figure 3:
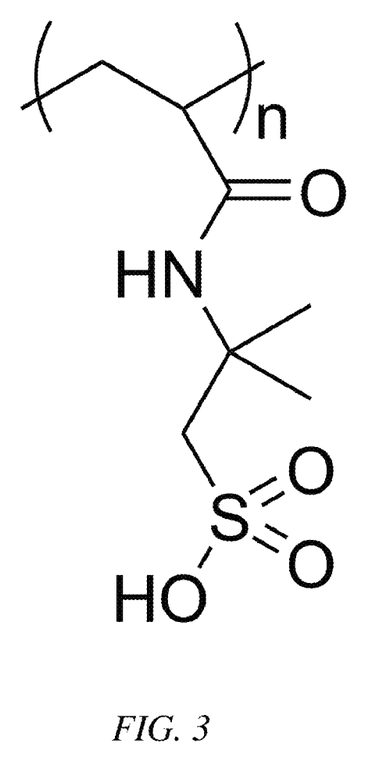
FIG. 3 illustrates the molecular structure of an acrylamido-methyl-propane sulfonate (AMPS) polymer.

In an embodiment, the RMA comprises a polymeric material such as a linear polymer, a branched polymer, or a polymer having hydrophobic, hydrophilic, or ionic association structures. Alternatively, the RMA comprises an acrylic polymer, alternatively an anionic acrylic polymer. Nonlimiting examples of polymers suitable for use in this disclosure include acrylamide vinyl phosphoric acid, N,N-dimethyl acrylamide, lignite grafted acrylamide, tannin grafted AMPS, humate grafted acrylamide diallyldimethylammonium chloride, acrylic acid, itaconic acid, or combinations thereof. In an embodiment, the RMA comprises a 2-acrylamido-2-methylpropane sulfonic acid polymer (AMPS) or acids or salts thereof. Hereinafter the disclosure will refer to use of AMPS as the polymeric material in the RMA although other polymeric materials as disclosed herein are also contemplated. The structure of AMPS is illustrated in FIG. 3.

In an embodiment, the RMA comprises an AMPS polymer with an average molecular weight of from about 20,000 Daltons to about 10,000,000 Daltons; alternatively from about 35,000 Daltons to about 5,000,000 Daltons; alternatively from about 50,000 Daltons to about 5,000,000 Daltons.

In an embodiment, AMPS polymer is present in the RMA in an amount of from about 0.01 to about 5.0 percent by weight of cement, alternatively from about 0.05 wt. % to about 1 wt. %, alternatively from about 0.1 wt. % to about 0.5 wt. %.

In an embodiment, the RMA comprises a gum and a polymeric material both of the type described herein wherein the ratio of gum to polymeric material is from about 0.01 to about 0.9, alternatively from about 0.05 to about 0.75, alternatively from about 0.1 to about 0.6.

In an embodiment, the RMA comprises DIUTAN gum and AMPS polymer wherein the diutan gum is present in an amount of from about 0.01 wt. % to about 0.9 wt. %, alternatively from about 0.05 wt. % to about 0.75 wt. %, alternatively from about 0.1 wt. % to about 0.6 wt. %.

In an embodiment, the RMA (i.e. combined amount of polymeric material and gum) is present in the wellbore servicing composition in an amount of from about 0.01 wt. % to about 10 wt. %, alternatively from about 0.05 wt. % to about 5 wt. % alternatively from about 0.1 wt. % to about 1 wt. % by total weight of wellbore servicing composition.

In an embodiment, the wellbore servicing composition comprises a cementitious material. Any cement suitable for use in subterranean well cementing operations may be included in the cement compositions of this disclosure. In an embodiment, the cementitious materials comprise a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Other examples of cements suitable for use in this disclosure are described in U.S. Pat. Nos. 6,457,524; 7,077,203; and 7,174,962, each of which is incorporated herein by reference in its entirety. In an embodiment, the cementitious material is present in the wellbore servicing composition in an amount of from about 1 to about 99% by total weight of the composition, alternatively from about 20% to about 80%, alternatively from about 35% to about 65%.

In an embodiment, the RMA comprises a gum and a polymeric material which are individually introduced to the wellbore servicing composition and function as described herein. The gum and polymeric material may be introduced to the wellbore servicing composition in any order that results in the advantageous properties described herein. In some embodiments, the gum, polymeric material, or both are premixed with the cementitious material prior to the addition of other components of the wellbore servicing composition. For example, a method of preparing the wellbore servicing composition may comprise dry blending a cementitious material with a polymeric material and a gum (i.e., a RMA) both of the type described previously herein. Alternatively, the cementitious material may be dry blended with the polymeric material before being contacted with the gum and other components of the wellbore servicing composition. Alternatively, the cementitious material may be dry blended with the gum before being contacted with the polymeric material and other components of the wellbore servicing composition. In an embodiment, the gum and polymeric material are contacted with any dry components of the wellbore servicing composition prior to the introduction of a liquid component.

In an embodiment, the wellbore servicing compositions comprise water. Water suitable for use in this disclosure include without limitation fresh water, salt water (e.g., water containing one or more salts dissolved therein), brine (e.g., saturated salt water produced from subterranean formations), or seawater. Generally, the water may be from any source provided that it does not contain an excess of compounds that adversely affect other components in the cement composition. In an embodiment, water is present in the wellbore servicing composition in an amount sufficient to meet some user and/or process desired need. In an embodiment, the wellbore servicing composition comprises a high-water content cement composition. Herein a high-water content cement composition refers to a cement composition having a water content equal to or greater than about 70 wt. % by weight of cement. In an embodiment, the cement composition has a water content of from about 125 wt. % to about 25 wt. % by weight of cement, alternatively from about 100 wt. % to about 50 wt. %, alternatively from about 80 wt. % to about 60 wt. %. Such high-water content cement compositions may be characterized by a density of from about 10 pounds per gallon (ppg) to about 15 ppg, alternatively from about 11 ppg to about 14 ppg, alternatively from about 12 ppg to about 13 ppg.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, vitrified shale and other fillers such as silica flour, sand and slag, formation conditioning agents, hollow glass or ceramic beads or combinations thereof. Other mechanical property modifying additives, for example, elastomers, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art. In some embodiments, the compositions may be foamed using an inert gas such as nitrogen. Foamed cement compositions are described in U.S. Pat. Nos. 6,332,921; 5,900,053 and 6,143,069 each of which are incorporated by reference herein in its entirety.

In an embodiment, the wellbore servicing compositions comprises a high-water content cement slurry having from about 1 wt. % to about 99 wt. % cementitious material, from about 25 wt. % to about 125 wt. % water, and from about 0.01 wt. % to about 10 wt. % RMA by weight of cement. Alternatively, the wellbore servicing compositions comprises a high-water content cement slurry having from about 35 wt. % to about 65 wt. % cementitious material, from about 60 wt. % to about 80 wt. % water, and from about 0.1 wt. % to about 0.6 wt. % RMA.

In an embodiment, the RMA is a component of a spacer fluid. A spacer fluid is a fluid used to displace one performance fluid, such as a drilling fluid, in a well bore before the introduction into the well bore of another performance fluid, such as a cement slurry. Spacer fluids are often used in oil and gas wells to facilitate improved displacement efficiency when pumping new fluids into the well bore. Spacer fluids are also used to enhance solids removal during drilling operations, to enhance displacement efficiency and to physically separate chemically incompatible fluids.

Any spacer fluid compatible with some user and/or process desired need may be employed. For example the spacer fluid may comprise a fluid, a weighting agent, and a suspending agent. In an embodiment, an RMA of the type described herein is present in the spacer fluid in an amount of from about 0.001 to about 10%, alternatively from about 0.005% to about 8.0%, alternatively from about 0.01% to about 0.5% by weight of fluid.

In an embodiment, the wellbore servicing composition comprises a cementitious material, water, an RMA and optional additives all of the type described previously herein. Such a composition is hereinafter termed a rheologically modified sealant composition (RMSC). RMSCs of the type described herein may form lightweight cement slurries having a density of less than about 17 ppg, alternatively from about 10 ppg to about 15 ppg, and alternatively from about 12 ppg to about 14 ppg.

In an embodiment, the RMSC exhibits a stable rheology at temperatures of from about 0° F. to about 155° F., alternatively from about 10° F. to about 135° F., and alternatively from about 25° F. to about 120° F. Herein a stable rheology refers to the observation of minimal settling of the slurry components. In an embodiment, the RMSC's stable rheology results in the composition having a uniform density. Density uniformity may be measured by using a BP settling test wherein a sample wellbore servicing fluid (e.g., RMSC) is sectioned about equally into an upper, middle, and lower portion and the density of each portion is determined. BP-settling tests measure the amount of settling that occurs in a cement slurry from the time it is placed until the cement sets and is determined in accordance with API RB 10B Recommended Practices for Testing Oil Well Cements and Cement Additives, the relevant portions of which are incorporated by reference herein. Specifically, the test involves preconditioning the cement slurry (i.e., RMSC) at the bottom hole circulating temperature (BHCT) in a high-pressure/high temperature curing chamber and curing the cement at the specified temperature. After the sample is set, the mold is removed and the column of cement is removed. The cement column is cut into segments and the density of each segment is measured. In an embodiment, RMSCs of the type described herein may comprise a composition which sets upon standing under typical wellbore conditions. In such embodiments, the set composition when sectioned into about equal upper, middle, and lower portions may display a vertical variation in density of from about 0 to about 0.5 ppg, alternatively from about 0.1 ppg to about 0.4 ppg, alternatively from about 0.2 ppg to about 0.3 ppg.

In an embodiment, the RMSC is further characterized by a plastic viscosity of from about 1 to about 300 centipoise (cP), alternatively from about 2 cP to about 250 cP, and alternatively from about 5 cP to about 200 cP and a yield point of from about 1 pounds force per 100 square feet (lbs/100 ft$^2$) to about 100 lbs/100 ft$^2$, alternatively from about 2 lbs/100 ft$^2$ to about 80 lbs/100 ft$^2$, and alternatively from about 5 lbs/100 ft$^2$ to about 50 lbs/100 ft$^2$. The plastic viscosity is an absolute flow property indicating the flow resistance of certain types of fluids and is a measure of shearing stress while the yield point refers to the resistance of the drilling fluid to initial flow, or represents the stress required to start fluid movement.

In an embodiment, RMSCs of this disclosure may have a decreased permeability and consequently a decreased fluid loss when compared to an otherwise similar composition lacking an RMA. Fluid loss may be measured in accordance with American Petroleum Institute (API) Specification 10A, 23$^{rd}$ Edition, April 2002. In an embodiment, the RMSC when set may display a fluid loss of from about 0 to about 200 milliliters in 30 minutes, alternatively from about 5 milliliters in 30 minutes to about 150 milliliters in 30 minutes, alternatively from about 10 milliliters in 30 minutes to about 100 milliliters in 30 minutes.

In an embodiment, the RMSCs of this disclosure display a tunable rheology which refers to the ability to adjust both the YP and the PV of a wellbore servicing fluid by adjusting the gum to polymer ratio of the RMA. In an embodiment, adjustment of the gum to polymer ratio is done at the site of the wellbore servicing operation. In such an embodiment, the YP and PV of the wellbore servicing fluid are adjusted at the site of the wellbore servicing operation based on an evaluation of the complexity of the wellbore. For example, the rheological profile may be adjusted to provide advantageous rheological properties in situations wherein the wellbore servicing operation would involve thin annuli and/or highly eccentric wellbores. Alternatively, adjustment of the gum to polymer ratio is done off-site.

In an embodiment, the RMSCs may be employed in well completion operations such as primary and secondary cementing operations. Primary and secondary cementing operations refer to wellbore completion processes as known to those skilled in the art, and RMSCs for use in such cementing operations may or may not contain cement. The RMSC may be placed into an annulus of the wellbore and allowed to set such that it isolates the subterranean formation from a different portion of the wellbore. The RMSC thus forms a barrier that prevents fluids in that subterranean formation from migrating into other subterranean formations. Within the annulus, the RMSC also serves to support a conduit, e.g., casing, in the wellbore. In an embodiment, the wellbore in which the RMSC is positioned belongs to a multilateral wellbore configuration. It is to be understood that a multilateral wellbore configuration includes at least two principal wellbores connected by one or more ancillary wellbores.

In secondary cementing, often referred to as squeeze cementing, the sealant composition may be strategically positioned in the wellbore to plug a void or crack in the conduit, to plug a void or crack in the hardened RMSC (e.g., cement sheath) residing in the annulus, to plug a relatively small opening known as a microannulus between the hardened sealant and the conduit, and so forth. In an embodiment, the RMSC is introduced to a wellbore that has developed one or more microannuli. Introduction of the RMSC may involve forcibly injecting under pressure (squeezing) the material into one or more microannuli accessible to the user. Introduction of the RMSC is typically followed by a shut-in period wherein the fluid is allowed to form a gel. Subsequent forcible injections of the RMSC and shut-in periods may be carried out until the squeeze pressures reach values that are sufficiently high so as to insure blockage of the microannuli. In some embodiments, the RMSC is introduced to an abandoned or leaking well in order to mitigate pressure behind the casing or at a wellhead.

Various procedures that may be followed to use a sealant composition in a wellbore are described in U.S. Pat. Nos. 5,346,012 and 5,588,488, which are incorporated by reference herein in their entirety.

In an embodiment, an RMSC of the typed described herein is introduced to a subterranean wellbore and allowed to set therein. The RMSC may be introduced to a subterranean wellbore comprising one or more eccentric wells. The RMSC may set with minimal settling of its constituents as described previously herein. The minimal settling characteristic of RMSCs of this disclosure allows or facilitates placement of the cement composition.

The RMSC may be introduced to the wellbore to prevent the loss of aqueous or non-aqueous drilling fluids into loss-circulation zones such as voids, vugular zones, and natural or induced fractures while drilling. In an embodiment, the RMSC is placed into a wellbore as a single stream and activated by downhole conditions to form a barrier that substantially seals loss circulation zones. In such an embodiment, the RMSC may be placed downhole through the drill bit forming a composition that substantially eliminates the lost circulation. Methods for introducing compositions into a wellbore to seal subterranean zones are described in U.S. Pat. Nos. 5,913,364; 6,167,967; and 6,258,757, each of which is incorporated by reference herein in its entirety.

The RMSC, after hardening, may form a non-flowing, intact mass with good strength and capable of withstanding the hydrostatic pressure inside the loss-circulation zone. Said RMSC may plug the zone and inhibit the loss of subsequently pumped drilling fluid thus allowing for further drilling. It is to be understood that, it may be desired to hasten the viscosification reaction for swift plugging of the voids. Alternatively, it may be desired to prolong or delay the viscosification for deeper penetration into the voids. For example, the RMSC may form a mass that plugs the zone at elevated temperatures, such as those found at higher depths within a wellbore.

In various embodiments, RMSCs of this disclosure may comprise high-water content cement slurries with increased rheological stability when compared to an otherwise similar slurry lacking the RMA. The inclusion of an RMA of the type described herein may allow for the preparation of a high-water content cementitious composition having a density within the ranges previously disclosed herein. Such high-water content cementitious composition may display lower viscosities than normally observed with the use of other water extending additives (e.g., bentonite) while also exhibiting rheological stability. Furthermore, the RMA of this disclosure may impart the aforementioned benefits at temperatures below about 300° F. and at concentrations of roughly 0.1 wt. % to 0.6 wt. % by weight of cement when compared to a number of conventional suspension agents.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

An RMA of the type described herein was used to modify the rheological properties of a cement composition. The RMA comprised a gum and an AMPS polymer. The AMPS polymer was either HALAD-344 or HALAD-413 which are fluid loss additives commercially available from Halliburton Energy Services. The polysaccharide gum was DIUTAN which is commercially available from CP Kelco. The amount of DIUTAN or AMPS polymer present is given in terms of the use of a "high level" and a "low level." A high level of DIUTAN refers to 0.3 wt. % by weight of water while a low level of DIUTAN refers to 0.075 wt. %. A high level of AMPS polymer refers to 0.5 wt. % by weight of cement while a low level of AMPS polymer refers to 0.125 wt. %.

A factorial design technique was used to design the experimental program of the cement mixtures. This experiment was used to determine the effects of the individual components and/or synergistic effects between the components. Factorial design offers a more effective way of investigating the effects of various factors, when the levels of those factors are varied, on responses of a system than if each factor was studied separately. Moreover, the factorial design allows for a minimum number of experiments to be performed and still obtain all the significant information (Montgomery, 1991). Table 1 shows the factorial design matrix used for DIUTAN and HALAD-344 fluid loss additive at two levels. Table 2 shows the water content of the cement slurry compositions at 12, 13, 14, and 15 lb/gallon, respectively.

TABLE 1

| Sample | Cement % bwoc | DIUTAN % bwow | HALAD-344 fluid loss additive % bwoc |
|---|---|---|---|
| A | 100 | 0 (−) | 0 (−) |
| B | 100 | 0.3 (+) | 0 (−) |
| C | 100 | 0.3 (+) | 0.5 (+) |
| D | 100 | 0 (−) | 0.5 (+) |
| E | 100 | 0.15 (½) | 0.25 (½) |
| F | 100 | 0.075 (¼) | 0.375 (¼) |
| G | 100 | 0.225 (¾) | 0.125 (¾) | bwoc = by weight of cement
bwow = by weight of water

TABLE 2

| Cement | Water (% bwoc) | | | |
|---|---|---|---|---|
| % bwoc | 12 lb/gallon | 13 lb/gallon | 14 lb/gallon | 15 lb/gallon |
| 100 | 124.28 | 90.957 | 69.385 | 54.28 |

HALAD-344 fluid loss additive was replaced with HALAD-413 fluid loss additive and the above factorial design was repeated. Symbols (+) and (−) are used to indicate a compound at its high and low concentration levels. Values (½), (¼) and (¾) are used to indicate a compound is at its half, quarter and three-quarter concentrations, respectively. For example, sample C was designed to study the effect of DIUTAN and HALAD-344 fluid loss additive on the rheological properties of the cement and therefore DIUTAN and HALAD-344 fluid loss additive are both at their high levels (+). Sample B was designed to study the effect of DIUTAN only and therefore DIUTAN is at its high level (+) whereas HALAD-344 fluid loss additive is at its low level (−).

Cement slurries were mixed according to the procedure outlined in API Spec 10B: Recommended Practice for Testing Well Cements. Plastic viscosity (PV) and yield point (YP) were measured using a standard bob and sleeve viscometer (Chandler manufacturing) in atmospheric environment. YP and PV were quantified by assuming a Bingham Plastic best fit approximation (Equation 1) of the shear stress versus shear strain values measured from the viscometer. The Bingham model is a two-parameter rheological model used to describe the characteristics of fluids. For example, YP is the stress required to yield the fluid, or allow it to flow. PV is the slope of the stress versus strain graph.

$$\tau = \tau_y + \mu \dot{\gamma} \qquad \text{Equation 1}$$

where $\tau_y$ is the yield stress in lb/100 ft$^2$ and $\mu$ is plastic viscosity in centipoises (cP) and $\dot{\gamma}$ is the apparent shear rate in s$^{-1}$.

The results of determination of the YP and PV for compositions containing an RMA of the type described herein are shown in Table 3.

TABLE 3

| | 12 lb/gallon cement | | 13 lb/gallon cement | |
|---|---|---|---|---|
| Sample | YP (lb/100 ft$^2$) | PV (cP) | YP (lb/100 ft$^2$) | PV (cP) |
| A | 1.46 | 6.00 | 2.33 | 7.06 |
| B | 8.32 | 19.86 | 14.41 | 32.31 |
| C | 12.60 | 42.72 | 21.79 | 68.96 |
| D | 1.36 | 7.58 | 1.73 | 16.55 |
| E | 4.17 | 20.35 | 7.29 | 38.21 |
| F | 4.00 | 24.21 | 3.53 | 32.42 |
| G | 5.14 | 19.86 | 9.91 | 33.60 |

| | 14 lb/gallon cement | | 15 lb/gallon cement | |
|---|---|---|---|---|
| Sample | YP (lb/100 ft$^2$) | PV (cP) | YP (lb/100 ft$^2$) | PV (cP) |
| A | 3.48 | 12.10 | 5.81 | 19.16 |
| B | 18.84 | 55.03 | 29.60 | 97.144 |
| C | 30.44 | 127.87 | 48.18 | 219.54 |
| D | 2.36 | 34.86 | 5.18 | 1.58 |
| E | 8.31 | 54.76 | 14.96 | 109.14 |
| F | 5.72 | 55.56 | 11.22 | 113.96 |
| G | 10.81 | 51.82 | 20.66 | 102.85 |

A comparison of the results in Table 3 for Samples A, B, C, and D clearly indicates the significant effects of the RMA on the rheological properties of the cement composition. The YP and PV of neat cement (A) are increased by a factor of 5.7 and 3.3, respectively by the addition of DIUTAN. However, the YP and PV of the neat cement (A) are not changed when HALAD-344 fluid loss additive was added. These results demonstrate that DIUTAN effectively increases the yield stress and viscosity of the cement mixture, whereas HALAD-344 fluid loss additive has the opposite effect. Furthermore, it is interesting to note that the yield stress and viscosity of the neat cement are increased by a factor of 8.63 and 7.12, respectively, by adding DIUTAN and HALAD-344 fluid loss additive together (sample C). The yield stress and viscosity values of the sample C are also higher than those of the samples B (high in DIUTAN) and D (high in HALAD-344 fluid loss additive).

These results suggest that there are synergistic effects attributable to DIUTAN and HALAD-344 fluid loss additive that enhances the yield stress and viscosity properties of the cement composition. Similar effects of DIUTAN and HALAD-344 fluid loss additive and their synergistic effects on the yields stress and viscosity of the cement mixture are observed with cement compositions having different densities as shown in Tables 3.

To determine the level of significance of the concentration of the chemical compounds on the Bingham model parameters, the experimental results were also statistically analyzed using variance analysis. The analysis of variance is a useful tool to identify or determine the extent of effects (i.e., level of significance) that different factors (independent variables) have on the response (the dependent variable). In this study, the factors are chemical compounds and their interactions and the responses are the empirical constants in the Bingham model (parameters $\tau_y$ and $\mu$).

To perform an analysis of variance, six initial values were required; 1) the average effect of a factor, 2) a sum of squares (SS), 3) the number of degrees of freedom (df), 4) a mean square (MS) value, 5) an F value and 6) a Prob-F value. The level of significance of a factor is determined based on its probability of distribution value (Prob-F). It is generally accepted that a significant factor has a Prob-F value less than or equal to 0.05 (0.01≤Prob-F≤0.05) (Montgomery, 1991). The average effect of a factor is the difference between the average response at the first level of that factor and the average response at the second level of that factor. In this work, the first level is referred to as the low level, and the second level is referred to as the high level. The average factor effect is also known as the 'contrast' (Montgomery, 1991). The SS shows the distribution of a factor. Montgomery (1991) has suggested that for a factorial design experiment ($2^2$) with two replicates, the SS value can be calculated as the square of the contrast value of that factor divided by 4n, where n is the number of replicates. The number of degrees of freedom for each factor is equal to (n−1). The MS value is equal to the SS value for each factor divided by the number of degrees of freedom. The F value is the MS value of that factor divided by the number of degrees of freedom.

The contrast values for the significant factors can be either a positive or negative value. Montgomery (1991) suggests that a positive value means if the level of that variable is increased from the first level to the second level the response value will increase. A negative value (−) means if the level of the variable increases, the response value will decrease. Results of variance analysis of the effect of DIUTAN and HALAD-344 fluid loss additive on the Bingham model parameters are given in Table 4.

TABLE 4

| | | Degree of freedom (df) = 1 | | | |
|---|---|---|---|---|---|
| Source of variation | Regression coefficient | Sum of square (SS) | Mean square (MS) | F-value | Prob-F |
| | | 12 lb/gallon cement | | | |
| DIUTAN | +22.82 | 161.68 | 161.88 | 191.10 | <0.0001 |
| HALAD-344 fluid loss additive | −0.024 | 4.79 | 4.79 | 5.67 | 0.054 |
| DIUTAN:HALAD-344 fluid loss additive | +28.58 | 9.19 | 9.19 | 10.87 | <0.0165 |
| DIUTAN | +45.64 | 1230.80 | 123.80 | 1429.73 | <0.0001 |
| HALAD-344 fluid loss additive | +1.61 | 157.32 | 157.32 | 182.73 | <0.0001 |
| DIUTAN:HALAD-344 fluid loss additive | +148.2 | 247.08 | 247.08 | 287.01 | <0.0001 |
| | | 13 lb/gallon cement | | | |
| DIUTAN | +40.90 | 519.32 | 519.32 | 231.70 | <0.0001 |
| HALAD-344 fluid loss additive | −1.00 | 10.65 | 10.65 | 4.75 | 0.072 |
| DIUTAN:HALAD-344 fluid loss additive | +51.22 | 29.52 | 13.17 | 0.011 | <0.0110 |
| DIUTAN | +84.16 | 3009.83 | 3009.83 | 238.98 | <0.0001 |
| HALAD-344 fluid loss additive | 19.12 | 732.19 | 732.19 | 58.13 | 0.0003 |
| DIUTAN:HALAD-344 fluid loss additive | +180.60 | 366.95 | 29.14 | 0.0017 | <0.0001 |
| | | 14 lb/gallon cement | | | |
| DIUTAN | +51.42 | 957.67 | 957.67 | 26987.98 | <0.0001 |
| HALAD-344 fluid loss additive | −2.22 | 57.20 | 57.2 | 1611.86 | <0.0001 |
| DIUTAN:HALAD-344 fluid loss additive | +86.08 | 83.37 | 83.37 | 2349.35 | <0.0001 |
| DIUTAN | 144.89 | 9312.78 | 9312.78 | 89106.78 | <0.0001 |
| HALAD-344 fluid loss additive | +45.76 | 4541.19 | 4541.19 | 43451.1 | 0.0003 |
| DIUTAN:HALAD-344 fluid loss additive | +330.27 | 1227.13 | 1227.13 | 11741.46 | <0.0001 |
| | | 15 lb/gallon cement | | | |
| DIUTAN | +78.32 | 2204.78 | 2204.78 | 55655.85 | <0.0001 |
| HALAD-344 fluid loss additive | −3.248 | 164.97 | 164.97 | 4164.5 | <0.0001 |
| DIUTAN:HALAD-344 fluid loss additive | +129.416 | 188.42 | 188.42 | 4756.4 | <0.0001 |
| DIUTAN | +259.97 | 22973.6 | 22973.6 | $2.164 \times 10^5$ | <0.0001 |
| HALAD-344 fluid loss additive | +127.56 | 17285.17 | 17285.17 | $1.625 \times 10^5$ | 0.0003 |
| DIUTAN:HALAD-344 fluid loss additive | 389.11 | 1703.35 | 1703.35 | 16042.54 | <0.0001 |

For the cements having densities of 12 and 13 lb/gallon the data in Table 4 show that HALAD-344 fluid loss additive has no significant effects on the yield stress of the cement composition, and vice versa for DIUTAN and its interactions with HALAD-344 fluid loss additive. In other words, the DIUTAN appears to significantly affect the yield stress of the cement as well as its interaction with the HALAD-344 fluid loss additive. It was found that the factor effects for DIUTAN and DIUTAN-HALAD-344 fluid loss additive are positive (+). These results indicate that if the concentration of DIUTAN increases, the value of the yield stress also increases. By adding a small amount of HALAD-344 fluid loss additive into a cement composition predominantly high in DIUTAN, the yield stress of the cements (12 and 13 lb/gallon) decreases. Similar effects of DIUTAN and it interaction with HALAD-344 fluid loss additive on yield stress are found with the 14 and 15 lb/gallon cement compositions. However, Table 4 also illustrates that HALAD-344 fluid loss additive becomes a significant factor on yield stress as the density of the cement increases from 13 lb/gallon to 14 and 15 lb/gallon. The analysis of variance reveals that the factor effect of HALAD-344 fluid loss additive is negative (−), meaning that if the concentration of HALAD-344 fluid loss additive increases, the yield stress decreases.

Table 4 shows that for the Bingham viscosity, DIUTAN, HALAD-344 fluid loss additive and their interaction are significant factors for all cement samples. It was also found that cement viscosity increases with increasing concentration of either DIUTAN or HALAD-344 fluid loss additive or both because the factor effects of these compositions are negative.

From a two-level factorial design experiment, it is possible to develop a correlation that relates the significant chemical compounds to the Bingham model parameters. The relationship can be characterized by using a regression equation (e.g., linear, polynomial, power law, quadratic) to fit a set of experimental data. The analysis of variance revealed that the flow properties of the cement mixtures are affected by the concentration of more than one significant chemical compound. This means that the regression equation for the yield stress and viscosity must contain several significant variables. In this example, we found that a linear regression equation represents a good relationship between the yield stress and viscosity and the significant compounds (Equation 2 and Equation 3).

$$\tau_y = \beta_0 + \beta_1 \times \text{Diutan} + \beta_2 \times \text{Halad344} + \beta_3 \times (\text{Diutan-Halad344}) \quad \text{Equation 2}$$

$$\mu = \alpha_0 + \alpha_1 \times \text{Diutan} + \alpha_2 \times \text{Halad344} + \alpha_3 \times (\text{Diutan-Halad344}) \quad \text{Equation 3}$$

$\beta_i$ and $\alpha_i$ are the regression coefficients for the yield stress and viscosity parameters. Values of the regression coefficients are given in Table 5 for cement compositions having a density of 12, 13, 14, and 15 lb/gallon.

TABLE 5

| Density (lb/gallon) | $\beta_0$ | $\beta_1$ | $\beta_2$ | $\beta_3$ |
|---|---|---|---|---|
| 12 | 1.1 | 22.83 | 0.024 | 28.586 |
| 13 | 1.7 | 40.9 | 1 | 51.26 |
| 14 | 3.48 | 51.1 | 1.25 | 81.86 |
| 15 | 5.8 | 78.32 | 1.24 | 129.41 |
| Density (lb/gallon) | $\alpha_0$ | $\alpha_1$ | $\alpha_2$ | $\alpha_3$ |
| 12 | 6.29 | 45.64 | 1.61 | 148.2 |
| 13 | 8.43 | 84.16 | 19.12 | 180.6 |
| 14 | 12.09 | 143.08 | 45.66 | 333.93 |
| 15 | 19.12 | 259.97 | 127.56 | 389.11 |

Example 2

Replacing HALAD-344 fluid loss additive with HALAD-413 fluid loss additive, the experiment as described in Example 1 was performed and the results are shown in Table 6.

TABLE 6

| YP (lb/100 ft$^2$) | $\beta_0$ | $\beta_1$ | $\beta_2$ | $\beta_3$ |
|---|---|---|---|---|
| 13 lb/gallon | 2.3205 | 40.273 | 4.155 | 41.8867 |
| 14 lb/gallon | 1.856 | 73.7 | 2.284 | 13.4 |
| PV (cP) | $\alpha_0$ | $\alpha_1$ | $\alpha_2$ | $\alpha_3$ |
| 13 lb/gallon | 7.036 | 84.23 | 1.159 | 54.22 |
| 14 lb/gallon | 8.8945 | 119.346 | 5.288 | 176.88 |

Example 3

In order to validate the regression model developed, the models are used to estimate the yield stress and viscosity of 12, 13, 14, and 15 lb/gallon cement samples having different concentrations of DIUTAN and HALAD-344 fluid loss additive. The prediction results are shown in FIGS. 4 and 5 for the yield stress and viscosity, respectively.

Figure 4:
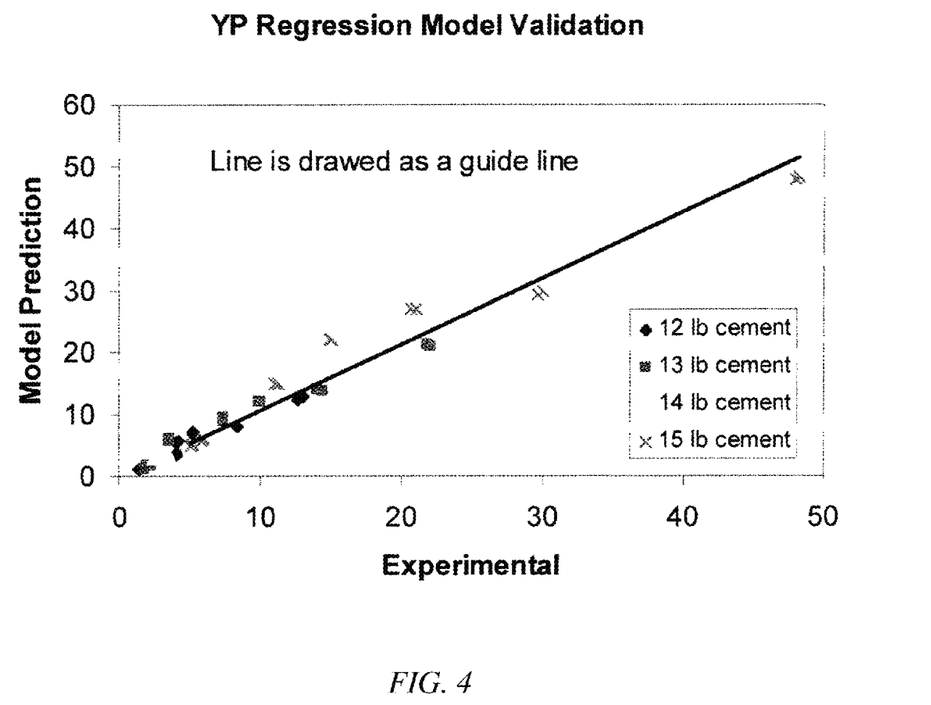
FIG. 4 is a plot of the experimental v. predicted yield point for cement samples containing DIUTAN and HALAD-344 fluid loss additive.
Figure 5:
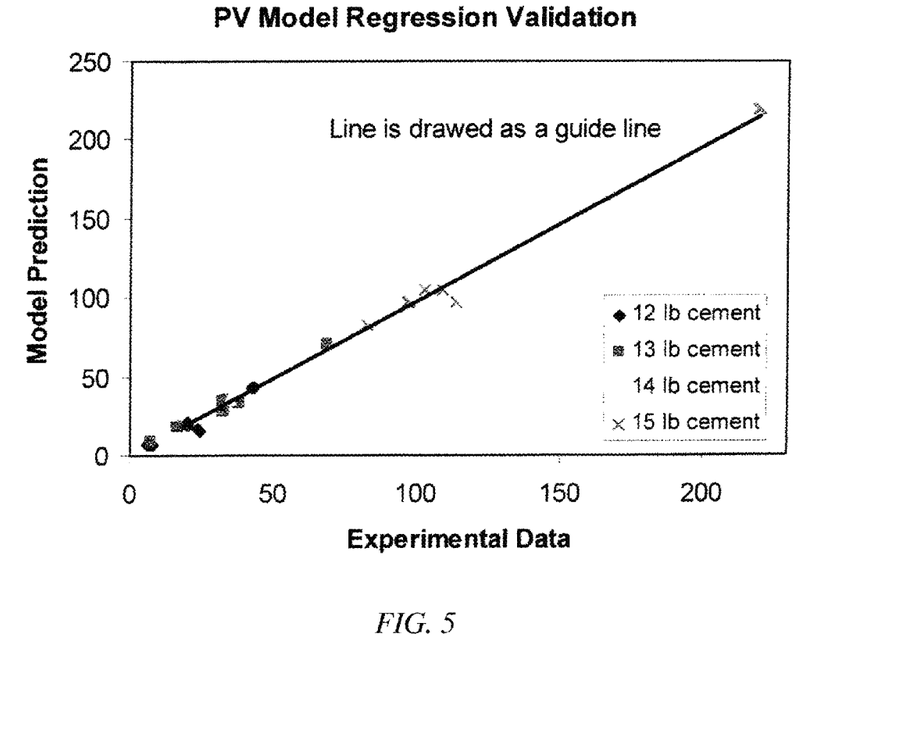
FIG. 5 is a plot of the experimental v. predicted plastic viscosity for cement samples containing DIUTAN and HALAD-344 fluid loss additive.

FIGS. 4 and 5 show a comparison between experimental data obtained for the cement mixtures and the predicted results that were obtained using the statistical model. The validations were performed with cement densities of 12, 13, 14, and 15 lb/gallon under room/atmospheric conditions. Small deviations between the model and the experimental data were observed with the yield stress for the 14 and 15 lb/gallon samples. This may be due to the slipping of theses samples during their rheological measurements. The model shows excellent agreement with the experimental data for plastic viscosity for all the cement samples tested.

The validation results demonstrate explicitly the accuracy of the statistical models developed for predicting yield stress and viscosity of the cement compositions comprising DIUTAN and HALAD-344 fluid loss additive for a cement density in the range of from 12 lb/gallon to 15 lb/gallon.

Figure 6:
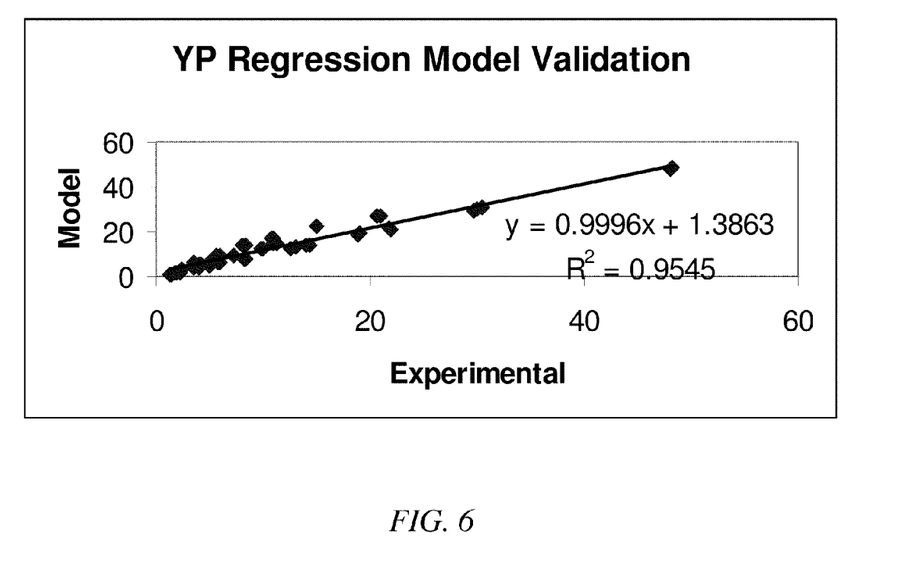
FIG. 6 is a plot of the experimental v. predicted yield point for cement samples containing DIUTAN and HALAD-413 fluid loss additive.
Figure 7:
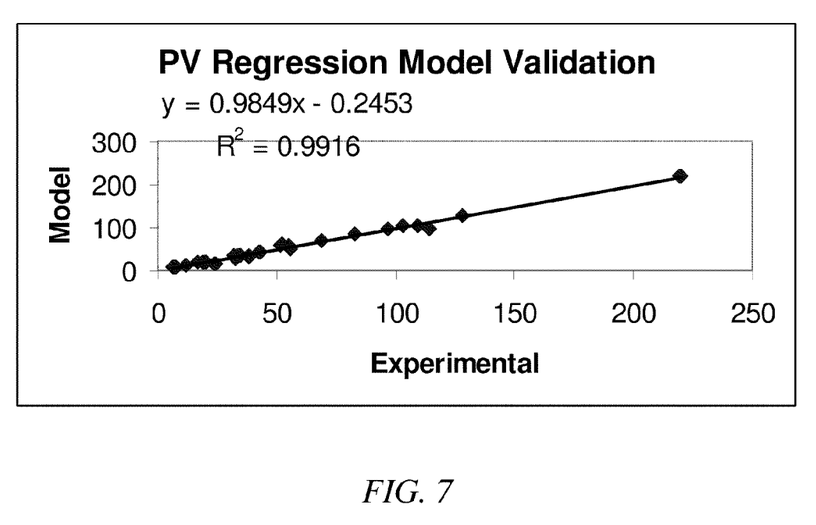
FIG. 7 is a plot of the experimental v. predicted plastic viscosity for cement samples containing DIUTAN and HALAD-413 fluid loss additive.

The same validation was performed for cement compositions comprising DIUTAN and HALAD-413 fluid loss additive. The results are shown in FIGS. 6 and 7, respectively.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore penetrating a subterranean formation comprising:
    contacting a wellbore servicing composition comprising a cementitious material with a rheology modifying additive, wherein the rheology modifying additive comprises a gum and a polymeric material; wherein the gum has an average molecular weight in the range of from about 20,000 Daltons to about 10,000,000 Daltons; wherein the polymeric material comprises acrylamide vinyl phosphoric acid, NN-dimethyl acrylamide, lignite grafted acrylamide, tannin grafted 2-acrylamido-2-methylpropane sulfonic acid polymer, humate grafted acrylamide diallyldimethlyammonium chloride, acrylic acid, itaconic acid, or combinations thereof:
    wherein the wellbore servicing composition comprises water and has a water content of from about 80 wt. % to about 125 wt. % by weight of cement; and wherein the composition has a plastic viscosity of from about 1 cP to about 300 cP.

2. The method of claim 1, wherein the gum is present in the rheology modifying additive an amount in the range of from about 0.01 wt. % to about 5 wt. % by weight of water.

3. The method of claim 1, wherein the gum has a double helical structure.

4. The method of claim 1, wherein the gum has a degradation temperature of less than about 310° F.

5. The method of claim 1, wherein the gum exhibits viscoplastic behavior.

6. The method of claim 1, wherein the gum comprises diutan, agar, alginic acid, beta-glucan, carrageenan, chicle gum, dammar gum, gellan gum, guar gum, gum arabic, gum ghatti, gum tragachanth, karava gum, locust bean gum, mastic gum, psyllium seed husks, sodium alginate, spruce gum, tara gum, xanthan gum, or combinations thereof.

7. The method of claim 1, wherein the polymeric material comprises 2-acrylamido-2-methylpropane sulfonic acid polymer (AMPS).

8. The method of claim 7, wherein the AMPS has a molecular weight of from about 20,000 Daltons to about 10,000,000 Daltons.

9. The method of claim 1, wherein the rheology modifying additive has a ratio of gum to polymeric material of from about 0.01 to about 0.9.

10. The method of claim 1, wherein the cementitious material comprises Portland cements, pozzolana cements, gypsum cements, high alumina content cements, silica cements, high alkalinity cements, calcium phosphate cements, or combinations thereof.

11. The method of claim 1, wherein the composition has a density of less than about 17 ppg.

12. The method of claim 1, wherein the composition has a yield point of from about 1 lb/100 ft$^2$ to about 100 lb/100 ft$^2$.

13. The method of claim 1, wherein the composition has a BP settling of from about 0 to about 5 ppg.

14. The method of claim 1, wherein the composition has a fluid loss of from about 0 to about 200 mls in 30 minutes.

15. The method of claim 1, wherein the wellbore servicing composition is a spacer fluid.

16. The method of claim 1, wherein both the yield point and plastic viscosity are increased when compared to an otherwise similar composition lacking a rheology modifying additive.

17. The method of claim 1, further comprising:
placing the composition in the wellbore and/or subterranean formation; and
allowing the cement composition to set therein.

18. A method of cementing in a wellbore penetrating a subterranean formation comprising:
providing a sealant composition comprising cement, water, and a rheology modifying additive wherein the rheology modifying additive comprises a gum and an anionic polymer wherein the sealant composition has a water content of from about 80 wt. % to about 125 wt. % by weight of cement and wherein the composition has a plastic viscosity of from about 1 cP to about 300 cP;
placing the composition in the wellbore and/or subterranean formation; and
allowing the cement composition to set therein.

19. The method of claim 18, wherein the cement composition has a density of from about 10 ppg to about 15 ppg.

20. The method of claim 18, wherein the sealant composition exhibits a fluid loss of from about 0 to about 200 milliliters in about 30 minutes.

21. A method of servicing a wellbore penetrating a subterranean formation comprising:
contacting a wellbore servicing composition comprising a cementitious material with a rheology modifying additive, wherein the theology modifying additive comprises a gum and a polymeric material; wherein the gum comprises diutan; and wherein the polymeric material comprises 2-acrylamido-2-methylpropane or a salt thereof.

22. The method of claim 21, further comprising:
placing the composition in the wellbore and/or subterranean formation; and
allowing the cement composition to set therein.

* * * * *